United States Patent
Vaughan et al.

(10) Patent No.: US 10,150,380 B2
(45) Date of Patent: Dec. 11, 2018

(54) DYNAMIC ALLOCATION OF POWER MODULES FOR CHARGING ELECTRIC VEHICLES

(71) Applicant: ChargePoint, Inc., Campbell, CA (US)

(72) Inventors: Peter Vaughan, Los Gatos, CA (US); David Baxter, Monte Sereno, CA (US); Carl F. Hagenmaier, Jr., Los Altos, CA (US); Patrick Kien Tran, Tracy, CA (US); Craig T. Matsuno, San Jose, CA (US); Gary A Eldridge, San Jose, CA (US); Pasquale Romano, Los Gatos, CA (US)

(73) Assignee: CHARGEPOINT, INC., Campbell, CA (US)

( * ) Notice: Subject to any disclaimer, the term of this patent is extended or adjusted under 35 U.S.C. 154(b) by 179 days.

(21) Appl. No.: 15/078,731

(22) Filed: Mar. 23, 2016

(65) Prior Publication Data

US 2017/0274792 A1 Sep. 28, 2017

(51) Int. Cl.
*B60L 11/18* (2006.01)
*H02J 7/00* (2006.01)

(52) U.S. Cl.
CPC ....... *B60L 11/1844* (2013.01); *B60L 11/1825* (2013.01); *B60L 11/1838* (2013.01); *H02J 7/0027* (2013.01)

(58) Field of Classification Search
CPC .............. B60L 11/1844; B60L 11/1848; B60L 11/1825; B60L 11/1838; H02J 7/0027
See application file for complete search history.

(56) References Cited

U.S. PATENT DOCUMENTS

| 3,824,813 A | 7/1974 | Davis |
| 5,307,001 A | 4/1994 | Heavey |

(Continued)

FOREIGN PATENT DOCUMENTS

| JP | 2015073431 A | 4/2015 |
| KR | 20100036896 A | 5/2011 |

(Continued)

OTHER PUBLICATIONS

Chen J.Y., et al., "A Remote Control System for Home Appliances Using the Internet and Radio Connection," 2004 IEEE International Symposium on Computer Aided Control Systems Design, Taipei, Taiwan, Sep. 24, 2004, pp. 249-254.

(Continued)

*Primary Examiner* — Naum B Levin
(74) *Attorney, Agent, or Firm* — Nicholson De Vos Webster & Elliott LLP

(57) ABSTRACT

Dynamic allocation of power modules for charging electric vehicles is described herein. A power cabinet includes multiple power modules that each are capable of supplying an amount of power to a dispenser. Multiple dispensers are coupled with the same power cabinet. A first power bus couples a first dispenser and switchably connects the power modules to the first dispenser; and a second power bus couples a second dispenser and switchably connects the power modules to the second dispenser. The power cabinet includes a control unit that is configured to cause the power modules to switchably connect and disconnect from the first power bus and the second power bus to dynamically allocate the power modules between the first dispenser and the second dispenser.

10 Claims, 8 Drawing Sheets

(56) References Cited

U.S. PATENT DOCUMENTS

| | | |
|---|---|---|
| 5,327,066 A | 7/1994 | Smith |
| 5,550,465 A | 8/1996 | Yamamoto et al. |
| 5,594,318 A | 1/1997 | Nor et al. |
| 5,656,916 A | 8/1997 | Hotta |
| 5,696,367 A | 12/1997 | Keith |
| 5,814,972 A | 9/1998 | Shimada et al. |
| 5,982,596 A | 11/1999 | Spencer et al. |
| 6,067,008 A | 5/2000 | Smith |
| 6,087,805 A | 7/2000 | Langston et al. |
| 6,114,775 A | 9/2000 | Chung et al. |
| 6,137,070 A | 10/2000 | Montague et al. |
| 6,225,776 B1 | 5/2001 | Chai |
| 6,614,204 B2 | 9/2003 | Pellegrino et al. |
| 6,646,561 B1 | 11/2003 | Zur et al. |
| 6,680,547 B1 | 1/2004 | Dailey |
| 7,071,698 B2 | 7/2006 | Furukawa et al. |
| 7,256,516 B2 * | 8/2007 | Buchanan ............ B60L 11/1811 307/62 |
| 7,486,034 B2 | 2/2009 | Nakamura et al. |
| 7,602,143 B2 | 10/2009 | Capizzo et al. |
| 7,719,284 B2 | 5/2010 | Ohta et al. |
| 7,746,049 B2 | 6/2010 | Sato |
| 7,812,469 B2 | 10/2010 | Asada |
| 7,834,613 B2 | 11/2010 | Ziegler et al. |
| 7,876,071 B2 | 1/2011 | Chen et al. |
| 8,013,570 B2 * | 9/2011 | Baxter .................. B60L 3/0084 320/101 |
| 8,374,729 B2 | 2/2013 | Chapel et al. |
| 8,410,755 B2 * | 4/2013 | Chau ..................... B60L 3/0046 320/118 |
| 8,731,730 B2 * | 5/2014 | Watkins .................... G06F 1/28 320/107 |
| 8,766,595 B2 * | 7/2014 | Gaul ................... B60L 11/1838 320/104 |
| 8,935,011 B2 * | 1/2015 | Tischer ..................... H02J 3/14 700/286 |
| 9,168,841 B2 * | 10/2015 | Kawai ................. B60L 11/1825 |
| 9,290,104 B2 * | 3/2016 | Gadh .................. B60L 11/1838 |
| 9,469,211 B2 * | 10/2016 | Baxter .................. B60L 3/0084 |
| 9,505,318 B2 * | 11/2016 | Hendrix ............. B60L 11/1838 |
| 9,766,671 B2 * | 9/2017 | Dorn ........................ G06F 1/26 |
| 9,908,421 B2 * | 3/2018 | Koolen ............... B60L 11/1811 |
| 2003/0052547 A1 | 3/2003 | Fischer et al. |
| 2004/0042138 A1 | 3/2004 | Saito et al. |
| 2004/0130292 A1 | 7/2004 | Buchanan et al. |
| 2005/0099131 A1 | 5/2005 | Amarillas et al. |
| 2006/0108971 A1 | 5/2006 | Ono |
| 2009/0021213 A1 | 1/2009 | Johnson |
| 2009/0045676 A1 | 2/2009 | Rosendahl |
| 2009/0066287 A1 | 3/2009 | Pollack et al. |
| 2009/0261779 A1 | 10/2009 | Zyren |
| 2009/0282274 A1 | 11/2009 | Langgood et al. |
| 2009/0313098 A1 | 12/2009 | Hafner et al. |
| 2010/0017249 A1 | 1/2010 | Fincham et al. |
| 2010/0026237 A1 | 2/2010 | Ichikawa et al. |
| 2010/0039062 A1 | 2/2010 | Gu et al. |
| 2010/0066170 A1 | 3/2010 | Schuler |
| 2010/0141204 A1 | 6/2010 | Tyler et al. |
| 2010/0181957 A1 * | 7/2010 | Goeltner ................. B60L 8/003 320/101 |
| 2010/0198440 A1 | 8/2010 | Fujitake |
| 2011/0050164 A1 | 3/2011 | Partovi et al. |
| 2011/0066515 A1 | 3/2011 | Horvath et al. |
| 2011/0140657 A1 | 6/2011 | Genzel et al. |
| 2011/0175569 A1 | 7/2011 | Austin |
| 2011/0184579 A1 | 7/2011 | Nilsen et al. |
| 2011/0285345 A1 * | 11/2011 | Kawai ................. B60L 11/1825 320/107 |
| 2012/0330494 A1 * | 12/2012 | Hendrix .............. B60L 11/1838 701/29.3 |
| 2013/0310999 A1 | 11/2013 | Baxter et al. |
| 2014/0067183 A1 | 3/2014 | Sisk et al. |
| 2014/0103866 A1 | 4/2014 | Kothavale et al. |
| 2015/0123613 A1 * | 5/2015 | Koolen ............... B60L 11/1844 320/109 |
| 2015/0165917 A1 | 6/2015 | Robers et al. |
| 2015/0301547 A1 * | 10/2015 | Johansson ........... B60L 11/1816 700/295 |
| 2016/0114693 A1 * | 4/2016 | Tsuno ................. B60L 11/1816 320/134 |
| 2016/0126732 A1 * | 5/2016 | Uyeki ....................... H02J 3/00 700/295 |
| 2016/0375781 A1 * | 12/2016 | Herke ................. B60L 11/1838 320/109 |
| 2017/0057369 A1 * | 3/2017 | N Sje ................... B60L 3/0069 |
| 2017/0106764 A1 * | 4/2017 | Beaston ............. B60L 11/1838 |

FOREIGN PATENT DOCUMENTS

| | | |
|---|---|---|
| WO | 2008142431 A1 | 11/2008 |
| WO | 2009034918 A1 | 3/2009 |

OTHER PUBLICATIONS

Notice of Allowance dated May 5, 2015 for U.S. Appl. No. 13/948,879, filed Jul. 23, 2013.

Notice of Allowance dated Mar. 31, 2015 for U.S. Appl. No. 14/298,842, filed Jun. 6, 2014.

Advisory Action from U.S. Appl. No. 12/508,488, dated Nov. 30, 2010, 3 pages.

Advisory Action from U.S. Appl. No. 12/641,285, dated Mar. 30, 2015, 2 pages.

Final Office Action from U.S. Appl. No. 12/508,488, dated Sep. 14, 2010, 10 pages.

Final Office Action from U.S. Appl. No. 12/641,285, dated Aug. 5, 2011, 11 pages.

Final Office Action from U.S. Appl. No. 12/641,285, dated Jul. 30, 2013, 16 pages.

Final Office Action from U.S. Appl. No. 12/641,285, dated May 18, 2016, 18 pages.

Final Office Action from U.S. Appl. No. 12/641,285, dated May 19, 2017, 14 pages.

Final Office Action from U.S. Appl. No. 12/641,285, dated Oct. 22, 2014, 17 pages.

International Search Report and Written Opinion for Application No. PCT/US2017/023682, dated Jun. 19, 2017, 12 pages.

Non-Final Office Action from U.S. Appl. No. 12/508,488, dated Jun. 23, 2010, 11 pages.

Non-Final Office Action from U.S. Appl. No. 12/641,285, dated Apr. 6, 2011, 14 pages.

Non-Final Office Action from U.S. Appl. No. 12/641,285, dated Dec. 17, 2012, 12 pages.

Non-Final Office Action from U.S. Appl. No. 12/641,285, dated Mar. 27, 2014, 21 pages.

Non-Final Office Action from U.S. Appl. No. 12/641,285, dated Oct. 7, 2015, 13 pages.

Non-Final Office Action from U.S. Appl. No. 12/641,285, dated Sep. 22, 2016, 13 pages.

Non-Final Office Action from U.S. Appl. No. 15/295,824, dated Feb. 10, 2017, 11 pages.

Notice of Allowance from U.S. Appl. No. 12/508,488, dated May 12, 2011, 9 pages.

Notice of Allowance from U.S. Appl. No. 13/226,422, dated Mar. 29, 2013, 13 pages.

Notice of Allowance from U.S. Appl. No. 13/948,879, dated Aug. 28, 2015, 13 pages.

Notice of Allowance from U.S. Appl. No. 14/298,842, dated Jul. 27, 2015, 12 pages.

Notice of Allowance from U.S. Appl. No. 14/956,264, dated Jan. 21, 2016, 18 pages.

Notice of Allowance from U.S. Appl. No. 14/956,264, dated Jun. 10, 2016, 13 pages.

Requirement for Restriction/Election from U.S. Appl. No. 12/508,488, dated Apr. 30, 2010, 9 pages.

International Search Report and Written Opinion for Application No. PCT/US2017/034575, dated Aug. 18, 2017, 15 pages.

(56) References Cited

OTHER PUBLICATIONS

Notice of Allowance from U.S. Appl. No. 12/641,285, dated Sep. 29, 2017, 14 pages.
Notice of Allowance from U.S. Appl. No. 15/295,824, dated Jul. 14, 2017, 9 pages.
Notice of Allowance from U.S. Appl. No. 15/295,824, dated Nov. 8, 2017, 19 pages.

* cited by examiner

DYNAMIC ALLOCATION OF POWER MODULES FOR CHARGING ELECTRIC VEHICLES

FIELD

Embodiments of the invention relate to the field of electric vehicle charging; and more specifically, to the dynamic allocation of power modules for charging electric vehicles.

BACKGROUND

Electric vehicle charging stations, sometimes referred to as EVSE, are used to charge electric vehicles (e.g., electric battery powered vehicles, gasoline/electric battery powered vehicle hybrid, etc.). An EVSE consists of a Dispenser that connects to the electric vehicle, and power conversion electronics that may be housed separate power cabinet. Dispensers may be located in designated charging locations (e.g., similar to locations of gas stations), adjacent to parking spaces (e.g., public parking spaces and/or private parking spaces), etc.

A group of dispensers may be electrically connected to the same power cabinet. Since the dispensers may not fully be utilized at all times (e.g., an electric vehicle may not be connected to a dispenser or an electric vehicle may be connected to a dispenser but is not charging or is charging very little), it may be uneconomical to design the infrastructure to support the maximum capacity of each dispenser connected to the power cabinet.

SUMMARY

Dynamic allocation of power modules for charging electric vehicles is described herein. A power cabinet includes multiple power modules that each are capable of supplying an amount of power to a dispenser. Multiple dispensers are coupled with the same power cabinet. A first power bus couples a first dispenser and switchably connects the power modules to the first dispenser; and a second power bus couples a second dispenser and switchably connects the power modules to the second dispenser. The power cabinet includes a control unit that is configured to cause the power modules to switchably connect and disconnect from the first power bus and the second power bus to dynamically allocate the power modules between the first dispenser and the second dispenser.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

A method and apparatus for dynamically allocating power modules for charging electric vehicles is described herein. The charging system includes multiple electric vehicle charging stations (herein referred to as a dispenser) connected to a power cabinet. The power cabinet includes multiple power modules that can each supply power to any one of the dispensers. The allocation of the power modules may be performed dynamically.

Figure 1:
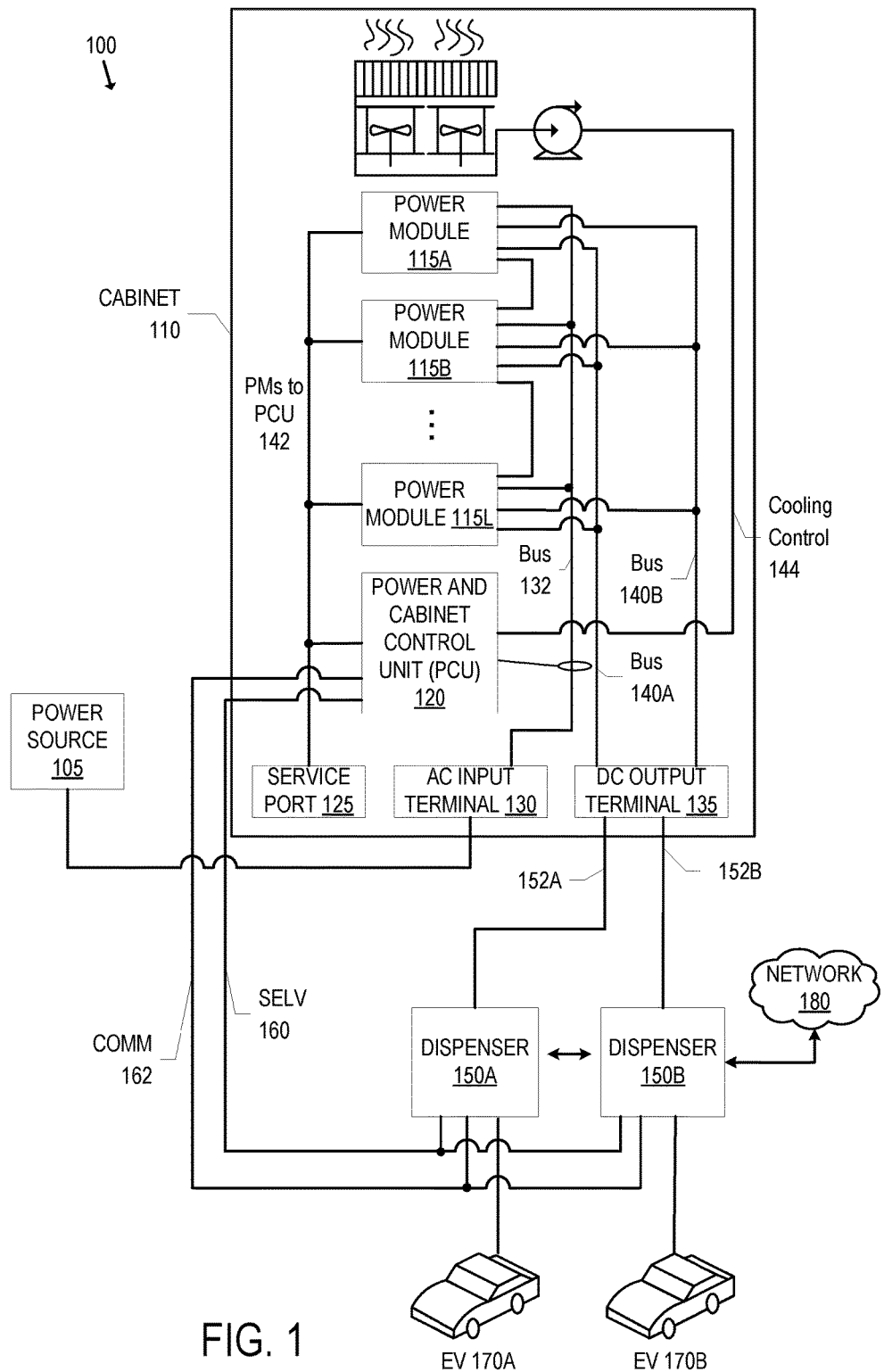
FIG. 1 illustrates an exemplary system for dynamically allocating power modules for charging electric vehicles according to an embodiment.

FIG. 1 illustrates an exemplary system 100 for dynamically allocating power modules for charging electric vehicles according to an embodiment. The system 100 includes a power source 105 that is connected to the power cabinet 110 through the AC input terminal 130. The power source 105 may be supplying, for example, 400 VAC/480 VAC, 3 phase. The power cabinet 110 includes a housing that includes the power modules 115A-L. Each of the power modules 115A-L can supply power to either of the EVSE 150A-B, depending on the allocation of power modules. Thus, each power module has the ability to supply power to multiple outputs, one output at a time. Each of the power modules 115A-L are coupled with the power and cabinet control unit (PCU) 120 over the PMs to PCU 142, switchably connected with the AC input terminal 130 over the bus 132, and switchably connected with the DC output terminal 135 through the power bus 140A and the power bus 140B. Each of the power modules 115A-L can be switchably connected to only one of the power buses 140A-B at a time. For instance, the power module 115A can be connected to the power bus 140A or the power bus 140B, but cannot be connected to both of the power buses 140A-B at the same time.

The power buses 140A-B are coupled with the DC output terminal 135, which itself is coupled with the EVSE 150A over the output 152A (corresponding with the power bus 140A) and coupled with the dispenser 150B over the output 152B (corresponding with the power bus 140B). Thus, the dispenser 150A is capable of receiving power from those of the power modules 115A-L (if any) that are connected to the bus 140A and the dispenser 150B is capable of receiving power from those of the power modules 115A-L (if any) that are connected to the bus 140B.

The PCU 120 manages the cabinet cooling including the cooling control 144. The PCU 120 communicates with the dispensers 150A-B over the communication line 162. The PCU 120 provides SELV supply 160 to the dispensers 150A-B.

In an embodiment, the dispensers 150A-B are coupled with the network 180. Each of the dispensers 150A-B may be coupled with the network 180 over a wide area network (WAN) link (e.g., cellular (CDMA, GRPS, etc.), WiFi Internet connection, Plain Old Telephone Service, leased line, etc.), or one of the dispensers may be coupled with the network 180 over a WAN link and coupled with the other dispenser over a LAN link (e.g., Wireless Personal Area Network (WPAN) such as Bluetooth, Zigbee, etc., Ethernet, Power Line Communication (PLC), WiFi, etc.) and relay messages between the other dispenser and the network 180. The network 180 may include one or more servers that provide services for electric vehicle charging such as authorization service, accounting service, and reporting service.

The network 180 may store vehicle operator information (e.g., operator account information, operator contact information (e.g., operator name, street address, email address, telephone number, etc.)), charging session information (e.g., the duration that an EV connected to a dispenser has been charging; the duration that an EV connected to a dispenser has been parked in proximity to the dispenser; the time remaining on each charging session; the type of account associated with each charging session; the amount of current drawn by the EV during the session; the percentage of charge complete of the EV during the session; the percentage of charge remaining of the EV; the battery temperature of the EV during the session; the type of EV during the session; and/or a reservation status of the EV), dispenser configuration information (e.g., the wiring group the dispenser belongs to (as used herein, a wiring group corresponds to the physical wiring connection to the charging cabinet), the capacity of the wiring group (e.g., the breaker size), and/or a trip margin used to prevent false circuit breaker trips), load supply condition information, and/or power module information (e.g., operating hours of each power module).

Each dispenser 150A-B is configured to control the application of power to the electric vehicles, which may dynamically change as detailed herein. Each dispenser 150A-B is capable of being connected to an electric vehicle such as the electric vehicles 170A-B respectively. The dispensers may support a wired connection for attached charging cords (e.g., with a connector conforming to SAE Electric Vehicle and Plug in Hybrid Electric Vehicle Conductive Charge Coupler (J1772_201602), February 2016 ("SAE J 1772"); a connector conforming to the CHAdeMO protocol) for charging electric vehicles, connector capable of connecting to Tesla Motors™ vehicles, a GB connector, and/or any other connector that attaches to an electric vehicle); and/or wireless charging (e.g., the dispensers may support inductive charging, and/or conductive charging (e.g., pantograph)).

Exemplary Charging Sequence

Charging service typically begins after an electric vehicle is connected to a dispenser and after a charging session has been authenticated. There are a number of different ways in which a charging session can be authenticated. For instance, an electric vehicle operator may request a charging session for their electric vehicle through use of a communication device (e.g., a WLAN or WPAN device such as a one or two-way radio-frequency identification (RFID) device, mobile communication device (e.g., laptops, palmtop, smartphone, multimedia mobile phone, cellular phone, wearable device, etc.). As a specific example, if the dispenser (or device connected to the dispenser such as a payment station) includes an RFID reader, the operator may wave/swipe the mobile communication (if an RFID enabled device) near the RFID reader to request a charging session. The dispenser may forward information read from the RFID reader (e.g., an identifier associated with the electric vehicle operator) to the network 180 for authentication. The network 180 determines whether to grant the charging session and replies to the dispenser with the response (e.g., allowed or denied). Alternatively, the dispenser may locally store authorization information (e.g., a whitelist or blacklist of identifiers) that allows the dispenser to determine whether to authorize the charging session. As another specific example, an electric vehicle operator may use a mobile application on a mobile device to request a charging session on the dispenser. For instance, the operator may select the dispenser using a locator map and then select to request a charging session (typically after logging into the application or otherwise providing user credentials to the application). The network 180 then determines whether to grant the charging session and replies to the dispenser with the response (e.g., allowed or denied). As another example, the dispenser may be configured to allow for automatic authentication. An example of automatic authentication includes ISO 15118 where the electric vehicle operator requests a charging session by connecting their electric vehicle to the dispenser and that electric vehicle communicates an identifier (e.g., the vehicles VIN or other identifying information) that is used by the dispenser and/or the network 180 to determine whether to grant or deny the charging session. Other examples of automatic authentication include use of license plate recognition (the license plate may be read by the dispenser or other device coupled with the dispenser and the number used to determine whether to grant or deny the charging session), facial recognition (the dispenser, or other device coupled with the dispenser, may include a camera to take an image of the electric vehicle operator to determine whether a charging session for the electric vehicle operator should be granted or denied), proximity detection (e.g., WiFi, Bluetooth, Bluetooth LE) that detects whether a mobile device of the electric vehicle operator or the vehicle itself is in proximity to the electric vehicle and use an associated identifier to determine whether to grant or deny the charging session.

The electric vehicle and the dispenser communicate after being connected. The dispenser may advertise the available power to the vehicle, which is sometimes referred to as the maximum available continuous current capacity. This advertisement may take the form of modulating a signal (e.g., a control pilot signal). The amount of power that may be available may be determined by the dispenser based at least in total site feed and/or demand response information received from the network 180 and/or the amount of power allocated from the power cabinet 110. In an embodiment, the electric vehicle may indicate a desired amount of power it wants to draw, which may change throughout the charging cycle (e.g., the electric vehicle may send a current command to the dispenser that the dispenser can use to determine how much power to supply to the electric vehicle).

In an embodiment, to determine the amount of power allocated from the power cabinet 110, the dispenser requests the status of the power modules 115A-L. The status of each power module 115A-L may indicate whether the power module is currently allocated (e.g., whether it is currently connected to a power bus and may indicate which power bus), whether the power module is idle (e.g., not currently connected to a power bus), or whether the power module is offline (e.g., it cannot be contacted). The dispenser may request the status of each power module 115A-L directly or may send a request to the PCU 120 which then queries the status of the power modules 115A-L and returns the statuses to the requesting dispenser. The status of each power module 115A-L may include an amount of time each power module has been operating. In another embodiment, the power cabinet 110 periodically sends status information of the power modules 115A-L to the dispensers 150A-B and/or to the network 180 (e.g., when the state of one of the power modules changes); which is used by the dispensers to determine the amount of power allocated from the power cabinet 110.

The requesting dispenser may determine which, if any, power module, is currently available, using the power module status information. In such an embodiment, the dispenser requests allocation of certain ones of the available power modules so that the dispenser can charge the connected electric vehicle. The requesting dispenser may send a command to each one of the selected available power modules 115A-L directly (which may be relayed by the PCU 120) that instructs the selected power module to switchably connect to the power bus that is connected to the dispenser. For instance, with respect to FIG. 1, the dispenser 150A may transmit a command to the selected ones of the power modules 115A-L (over the communication link 162) that instructs those power modules to switchably connect to the power bus 140A.

In another embodiment, the requesting dispenser requests the PCU 120 to determine which, if any, power module is currently available. In such an embodiment, the dispenser sends a request to the PCU 120 for power (the request may indicate how much power) and the PCU 120 may select from the available power modules (if any) to allocate to the requesting dispenser. The PCU 120 then instructs those selected power modules to switchably connect to the power bus that is connected to the dispenser. For instance, with respect to FIG. 1, the dispenser 150A may transmit a request to the PCU 120 for allocation of power (over the communication link 162) and the PCU 120 will determine which of the power modules 115A-L (if any) are available, select from those available power modules, and instruct those selected power modules to switchably connect to the power bus 140A.

In another embodiment, the requesting dispenser sends a request for power to the power cabinet 110. In response to this request, each power module that is available to be allocated to the dispenser is then allocated. The request may be sent to the PCU 120 which then causes the available power modules (if any) to be allocated to the requesting dispenser. In this embodiment, each available power module (at least of the power module group that can be allocated to the requesting dispenser) is allocated to the requesting power module, regardless of whether the electric vehicle and/or the dispenser can support supplying power to that amount. For instance, with respect to FIG. 1, the dispenser 150A may transmit a request for power to the PCU 120 which will then determine which of the power modules 115A-L (if any) are available and cause those power modules to be allocated to the dispenser 150A and switchably connect to the power bus 140A. The amount of power may be more than the dispenser and/or the electric vehicle can support. After the allocation of the available power modules, the dispenser 150A determines whether to release any of the power modules, such as the excess number of power modules that it needs.

The amount of power that the power modules 115A-L can supply to the dispensers 150A-B may not be enough to handle the maximum rating of the connected dispensers or the maximum capability of electric vehicles connected to those dispensers. As an example, consider the total amount of power that can be supplied by the power modules 115A-L to be 375 kW, and each of the dispensers 150A-B may be rated to dispense 350 kW. In order to not exceed the power capacity of the power cabinet 110 (which may cause a circuit breaker to trip if exceeded), the sum of the power draw of the dispensers 150A-B should be less than or equal to the total amount of power that can be supplied by the power modules 115A-L. As another example, if the EV 170A (capable of drawing 250 kW in this example) and the EV 170B (capable of drawing 150 kW in this example) are simultaneously connected to the dispensers 150A-B, the electric vehicles cannot both receive their maximum capability as that would exceed the total amount of power that can be supplied by the power modules 115A-L.

The allocation of the power modules 115A-L between the dispensers 150A-B can be done differently in different embodiments. For example, the allocation may be done on a first-come first-served basis. As another example, the allocation may be done on a round-robin basis. As another example, the allocation may be done dynamically and be based on a set of one or more factors.

Figure 2:
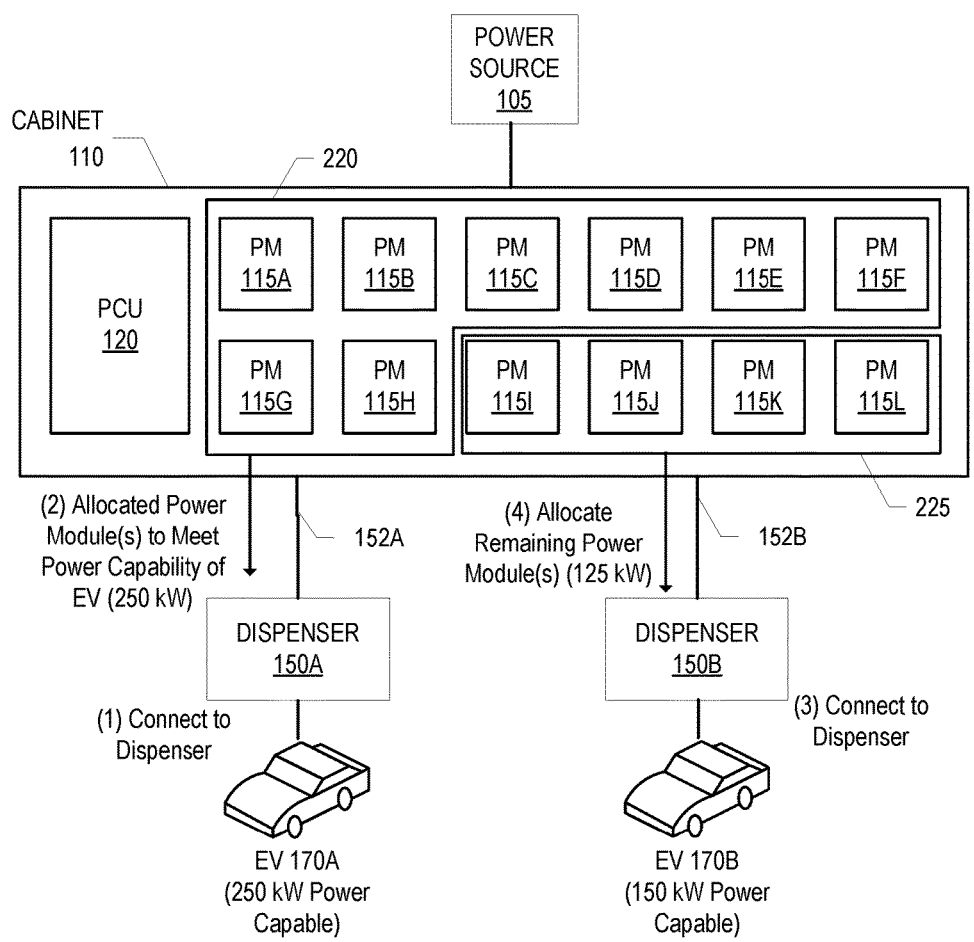
FIG. 2 illustrates an example of allocating power modules according to an embodiment.

FIG. 2 illustrates an example of allocating power modules according to an embodiment. In the example of FIG. 2, the EV 170A is capable of drawing 250 kW, the EV 170B is capable of drawing 150 kW, and the total amount of power that can be supplied by the power modules 115A-L is 375 kW (each capable of supplying 31.25 kW). The EV 170A arrives and connects to the dispenser 150A at a time 1. At time 1, the EV 170B is not connected to the dispenser 150B. Since at time 1 there are no power modules allocated to either of the dispensers 150A-B and the amount of power that can be supplied by the power modules 115A-L is greater than the capability of the EV 170A, at a time 2, the group of power modules 220 (the power modules 115A-H) are allocated to the dispenser 150A and are capable of supplying the maximum power capability of the EV 170A (250 kW). For instance, the power modules 115A-H are switchably connected to the power bus 140A.

In an embodiment, the dispenser 150A sends a request for power to the power cabinet 110 (e.g., to the PCU 120) which in turn determines that each of the power modules 115A-L are available and allocates each of the power modules 115A-L to the dispenser 150A. The request may be sent after the EV 170A is connected to the dispenser 150A and after the desired amount of power is determined for the EV 170A. As another example, the request may be sent prior to the EV 170A arriving to the dispenser 150A. For instance, if the EV 170A has a reservation at the dispenser 150A, the dispenser 150A may send the request for power to the power cabinet 110 at a time prior to and proximate to the reservation time. If the EV 170A does not show up for the reservation, the dispenser 150A may release the allocated power modules. As another example, through use of telemetry such as the navigation of the EV 170A and/or an app on a mobile device of an EV operator of the EV 170A, the dispenser 150A may send the request for power to the power cabinet 110 at a time when the EV 170A is determined to be near the dispenser 150A.

Sometime later, at a time 3, the EV 170B arrives and is connected to the dispenser 150B. At time 3, the EV 170A is still connected to the dispenser 150A and the group of power modules 220 are switchably connected to the power bus 140A. Thus, at time 3, the power modules 115A-H are not available to be allocated to the dispenser 150B. Since there is not enough remaining available power modules to allocate to the dispenser 150B to meet the maximum capability of the EV 170B, the remaining number of available power modules are allocated to the dispenser 150B. Thus, at a time 4, the group of power modules 225 (the power modules 115I-L) are allocated to the dispenser 150B and are capable of supplying 125 kW. For instance, the power modules 115I-L are switchably connected to the power bus 140B.

If the EV 170A becomes disconnected from the dispenser 150A and/or finishes charging, the group of power modules 220 may become available. For instance, the group of power modules 220 are switchably disconnected from the power bus 140A. Since the EV 170B is capable of more power than is currently allocated, some of the now available power modules may be allocated to the dispenser 150B. For instance, in this example, since the EV 170B is capable of drawing 150 kW and is currently allocated 4 power modules each capable of supplying 31.25 kW (a total of 125 kW), another power module capable of supplying 31.25 kW (a total of 156.25 kW) is allocated to the dispenser 150B so that the EV 170B can charge at its maximum capability.

Figure 3:
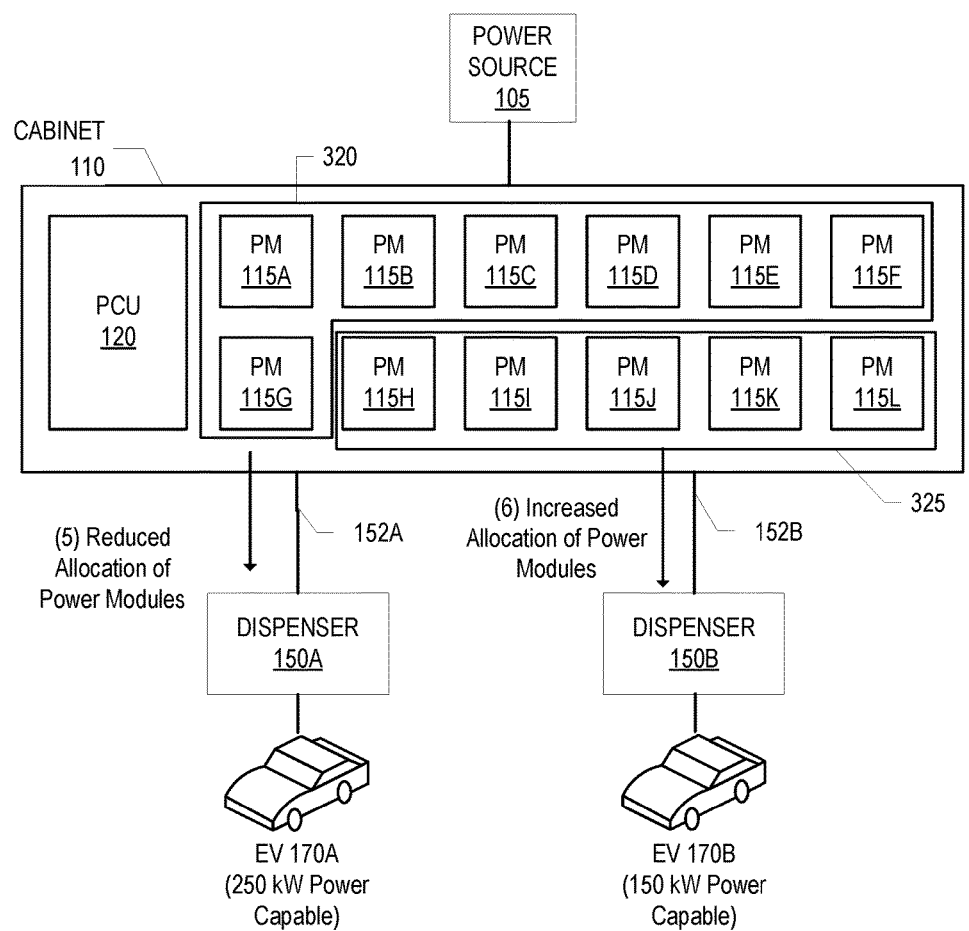
FIG. 3 illustrates an example of allocating power modules dynamically according to an embodiment.

In an embodiment, the allocation of the power modules 115A-L to the dispensers 150A-B is dynamic. For instance, FIG. 3 illustrates an example of allocating power modules dynamically according to an embodiment. The example of FIG. 3 is an extension of the example of FIG. 2. At time 5, the number of power modules allocated to the dispenser 150A is reduced. For instance, the power module 115H, previously allocated to the dispenser 150A, is deallocated from the dispenser 150A (e.g., switchably disconnected from the power bus 140A). The remaining group of power modules 320 (the power modules 115A-G) remain allocated to the dispenser 150A. Thus, the amount of power that is capable of being drawn through the dispenser 150A has been reduced from 250 kW to 218.75 kW. After deallocating the power module 115H from the dispenser 150A, that power module is available to be allocated to a different dispenser (e.g., the dispenser 150B). At time 6, the number of power modules allocated to the dispenser 150B is increased. For instance, the power module 115H is allocated to the dispenser 150B (e.g., switchably connected to the power bus 140B) and is part of the group of power modules 325 allocated to the dispenser 150B (the power modules 115H-L). Thus, the amount of power that is capable of being drawn through the dispenser 150B has been increased from 125 kW to 156.25 kW.

The decision to dynamically allocate the power modules may be done differently in different embodiments. In an embodiment, the power modules may be allocated across the different dispensers such that each of the dispensers are allocated at least some power modules (assuming that an EV is connected to the dispenser and is ready to accept energy), where the allocation may be on-demand (that is only if an electric vehicle is connected to that dispenser and requesting service). The power module allocation can be dynamically adjusted (either increased or decreased) to a particular dispenser based on a set of one or more factors. The set of factors may include one or more properties of active charging sessions on the dispensers, one or more properties of the dispensers (e.g., the maximum rate of power that can be dispensed by each dispenser, the current rate of power that is being dispensed by each dispenser, the number of dispensers that are requesting to provide charging service, the number of electric vehicle(s) expected to arrive at the dispenser), and load condition information. The one or more properties of the active charging sessions may include one or more of: the duration that each electric vehicle connected to the dispensers has been charging; the duration that each electric vehicle connected to the dispensers has been parked in proximity to the dispensers; the time remaining on each charging session; the type of account associated with each charging session; the amount of current drawn by each electric vehicle connected to the dispensers; the percentage of charge complete of each electric vehicle connected to the dispensers; the percentage of charge remaining of each electric vehicle connected to the dispensers; the battery temperature of each electric vehicle connected to the dispensers; the type of each electric vehicle connected to the dispensers; and a reservation status of each electric vehicle connected to the dispensers.

The duration that the electric vehicles connected to the dispensers have been charging may be taken into consideration when determining how to dynamically allocate power modules between those dispensers. For instance, a dispenser connected to an electric vehicle that has been charging longer may be allocated less power modules than a dispenser connected to an electric vehicle that has been charging relatively lesser.

The duration that the electric vehicles connected to the dispensers have been parked in proximity to the dispenser may be taken into consideration when determining how to dynamically allocate power modules between those dispensers. For instance, a dispenser connected to an electric vehicle that has been parked in proximity to the dispenser longer may be allocated less power modules than a dispenser connected to an electric vehicle that has been parked in proximity to the dispenser for a smaller amount of time.

The time remaining on the charging sessions may be taken into consideration when determining how to dynamically allocate power modules between those dispensers. For instance, the allocation of power modules may prioritize charging sessions that are about to end.

The type of account associated with the charging sessions may be taken into consideration when determining how to dynamically allocate power modules between those dispensers. For example, a charging session associated with an electric vehicle operator that is a member of a loyalty program of the host that owns or controls the dispensers may be prioritized over a charging session associated with an electric vehicle operator that is not a member of the loyalty program. As another example, a charging session associated with an electric vehicle operator that has paid a premium for charging service may be prioritized over a charging session associated with an electric vehicle operator that has not paid a premium for charging service.

The amount of current drawn by the electric vehicles connected to the dispensers may be taken into consideration when determining how to dynamically allocate power modules between those dispensers. For instance, the allocation of power modules may prioritize a dispenser connected to an electric vehicle that has drawn less current than a dispenser connected to an electric vehicle that has drawn more current.

The percentage of charge complete of the electric vehicles connected to the dispensers may be taken into consideration when determining how to dynamically allocate power modules between those dispensers. For instance, the allocation of power modules may prioritize a dispenser connected to an electric vehicle that has a lower percentage of charge complete over a dispenser connected to an electric vehicle that has a higher percentage of charge complete.

The percentage of charge remaining of the electric vehicles connected to the dispensers may be taken into consideration when determining how to dynamically allocate power modules between those dispensers. For instance, the allocation of power modules may prioritize a dispenser connected to an electric vehicle that has a higher percentage of charge remaining over a dispenser connected to an electric vehicle that has a lower percentage of charge remaining.

The battery temperature of the electric vehicles connected to the dispensers may be taken into consideration when determining how to dynamically allocate power modules between those dispensers. Electric vehicles reduce their rate of charge when the battery temperature reaches a certain amount. The allocation of power modules may prioritize a dispenser connected to an electric vehicle that has a lower battery temperature over a dispenser connected to an electric vehicle that has a higher battery temperature.

The type of the electric vehicles connected to the dispensers may be taken into consideration when determining how to dynamically allocate power modules between those dispensers. For instance, the allocation of power modules may prioritize a dispenser connected to a battery only electric vehicle (BEV) over a dispenser connected to a plug-in hybrid electric vehicle (PHEV).

The make and/or model of the electric vehicles connected to the dispensers may be taken into consideration when determining how to dynamically allocate power modules between those dispensers. For instance, the allocation of power modules may prioritize a dispenser connected to an electric vehicle of a certain make and/or model over a dispenser connected to an electric vehicle of a different make and/or model.

A reservation status of the electric vehicles connected to the dispensers may be taken into consideration when determining how to dynamically allocate power modules between those dispensers. For instance, an electric vehicle that has a valid reservation may be prioritized in the power module allocation over an electric vehicle that does not have a valid reservation.

Load supply conditions may be taken into consideration when determining how to dynamically allocate power modules. For instance, in periods of high demand (sometimes referred to as a demand response event), a message may be received that indicates that a reduction of power needs to be made. This may cause the total number of allocated power modules to be decreased until the demand response ends.

The number of electric vehicle(s) expected to arrive at the dispenser(s) may be taken into consideration when determining how to dynamically allocate power modules between those dispensers. For example, if use history of the dispensers indicate that the dispensers are historically busy at a certain time (e.g., morning commute, afternoon commute), the power modules may be allocated between those dispensers to support maximum use of the dispensers (e.g., the power modules may be allocated equally between the dispensers). As another example, the predicted arrival of EVs (e.g., based on state of charge of the EV and vehicle navigation information provided by an in-dash navigation unit and/or an app of a mobile device of an EV operator) may be used to allocate the power modules between those dispensers.

The allocation of power modules may be performed different in different embodiments. In an embodiment, the allocation of power modules is performed by the group of dispensers connected to the power cabinet themselves. In another embodiment, the allocation of power modules is performed by the power cabinet connected to the group of dispensers. In another embodiment, the allocation of power modules is performed by a server that is connected with the power cabinet and/or group of dispensers. In another embodiment, the allocation of power modules is performed in cooperation with multiple entities (e.g., the dispensers and the network, the dispensers and the power cabinet). In any such embodiment, the entity that determines the allocation of power modules has access to information that allows it to determine whether to dynamically adjust the allocation of power modules. This information (e.g., duration that each electric vehicle connected to the dispensers has been charging; duration that each electric vehicle connected to the dispensers has been parked in proximity to the dispensers; the time remaining on each charging session; the type of account associated with each charging session; the amount of current drawn by each electric vehicle connected to the dispensers; the percentage of charge complete of each electric vehicle connected to the dispensers; the percentage of charge remaining of each electric vehicle connected to the dispensers; the battery temperature of each electric vehicle connected to the dispensers; the type of each electric vehicle connected to the dispensers; a reservation status of each electric vehicle connected to the dispensers; the amount of power presently allocated to each dispenser (or the number of power modules presently allocated to each dispenser); the rate of power being dispensed by each dispenser; the number of electric vehicle(s) expected to arrive at the dispenser(s); and/or load condition information) may be stored and/or communicated between the group of dispensers themselves, the power cabinet, and/or the network.

In an embodiment where the group of dispensers determine how to allocate the power modules of the power cabinet, upon a dispenser receiving a request for charging service (e.g., an electric vehicle becomes connected to the dispenser), the dispenser requests the status of the power modules of the power cabinet. The dispenser may request the status of each power module directly or through a request to the power cabinet which then queries the status of the power modules and returns the statuses to the requesting dispenser. The status may also include an amount of time each power module has been operating. The dispenser uses the status information of the power modules when determining how to allocate the power modules of the power cabinet.

Figure 4:
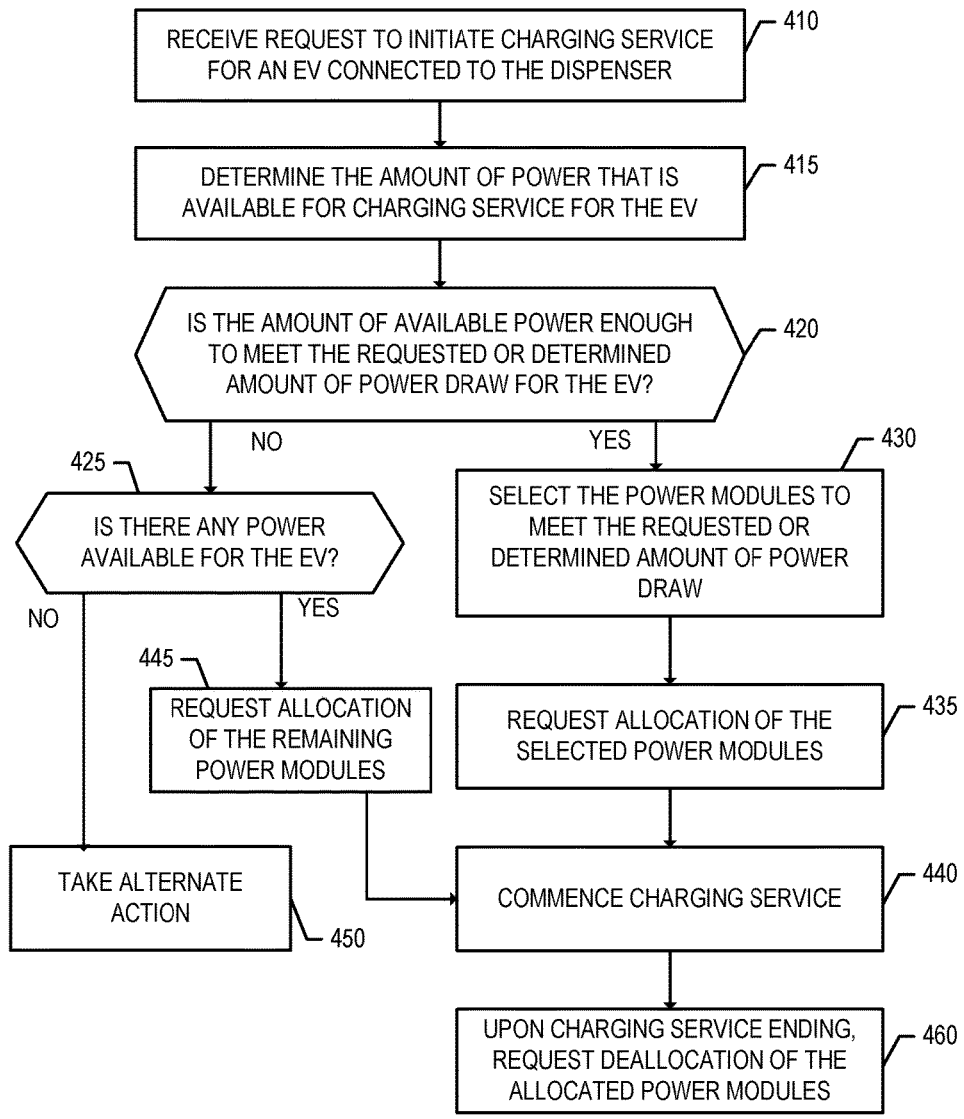
FIG. 4 is a flow diagram that illustrates exemplary operations for allocating power modules according to an embodiment.

FIG. 4 is a flow diagram that illustrates exemplary operations for allocating power modules according to an embodiment. The operations of FIG. 4 will be described with respect to the exemplary embodiments of the other figures. However, it should be understood that the operations of FIG. 4 can be performed by embodiments other than those discussed with reference to the other figures, and the embodiments discussed with reference to these other figures can perform operations different than those discussed with reference to FIG. 4.

At operation 410, a dispenser receives a request to initiate charging service for an electric vehicle that is connected to the dispenser. Different electric vehicles may desire to draw different amount of powers. With respect to FIG. 2, for example, the EV 170A is capable of drawing 250 kW and the EV 170B is capable of drawing 150 kW. The request to initiate charging service may indicate the desired amount of power draw. An electric vehicle operator may specify the desired amount of power draw. In an embodiment, the desired amount of power draw may be determined based on the model/make of the electric vehicle (which may be stored in association with an account of the electric vehicle operator requesting the charging service). In an embodiment, the electric vehicle transmits the requested power draw to the dispenser. Flow then moves to operation 415.

At operation 415, the dispenser determines the amount of power that is available for charging service for the electric vehicle. For example, the dispenser 150A may send request the status of each power module 115A-L of the power cabinet 110 directly or may send a request to the PCU 120 which then queries the status of the power modules 115A-L and returns the statuses to the dispenser 150A, which indicates status of the power modules 115A-L. The status of each power module 115A-L may include an amount of time each power module has been operating. The status of each power module 115A-L may indicate the amount of power that can be supplied by that power module. In another embodiment, the power cabinet 110 periodically sends status information of the power modules 115A-L to the dispensers 150A-B and/or to the network 180 (e.g., when the state of one of the power modules changes); which is used by the dispenser 150A to determine the amount of power that is available for charging service. Next, flow moves to operation 420.

At operation 420, the dispenser determines whether the amount of available power for charging the electric vehicle is enough to meet the requested or determined amount of power draw of the electric vehicle. For instance, the dispenser compares the amount of available power for charging the electric vehicle with the requested or determined amount of power draw for the electric vehicle. If there is enough available power for charging the electric vehicle, then flow moves to operation 430. If there is not enough available power for charging the electric vehicle, then flow moves to operation 425. For instance, in FIG. 2, there is enough power modules available to fully meet the power capability of the EV 170A when it is the only EV that is drawing power from the power modules of the power cabinet 110; however there is not enough power modules available to fully meet the power capability of the EV 170B if the EV 170A has been allocated power modules to fully meet its power capability.

At operation 430, the dispenser selects the power modules to meet the requested or determined amount of power draw. In an embodiment, the dispenser only selects the power modules that have a status of available. That is, the dispenser does not select from a power module that is currently allocated to another dispenser. From the available power modules, the dispenser may select those power module(s) that have the relatively lowest operating time. The dispenser may transmit the identification of the selected power modules to the other dispenser(s) connected to the power cabinet and/or to the network. Flow then moves to operation 435. In another embodiment, instead of the dispenser selecting the power modules, the dispenser requests a number of power modules and the power cabinet selects the requested number of power modules and allocates them accordingly.

At operation 435, the dispenser requests allocation of the selected power modules. The requesting dispenser may send a command to each one of the selected power modules directly (which may be relayed by the PCU 120) that causes the selected power module to switchably connect to the power bus that is connected to the dispenser. For instance, with respect to FIG. 1, the dispenser 150A may transmit a command to the selected ones of the power modules 115A-L (over the communication link 162) that causes those power modules to switchably connect to the power bus 140A. Flow then moves to operation 440 where charging service commences.

Flow moves from operation 440 to operation 460 where upon charging service ending, the dispenser requests deallocation of the allocated power modules. The charging service may end as a result of the charging session ending (e.g., the electric vehicle being disconnected from the dispenser). The requesting dispenser may send a command to each one of the allocated power modules directly (which may be relayed by the PCU 120) that causes the allocated power module to switchably disconnect from the power bus that is connected to the dispenser. For instance, with respect to FIG. 1, the dispenser 150A may transmit a command to the allocated ones of the power modules 115A-L (over the communication link 162) that causes those power modules to switchably disconnect from the power bus 140A. As another example, the requesting dispenser may send a command to the power cabinet that indicates that the dispenser has finished charging service and any allocated power module(s) may be deallocated from the dispenser. In an embodiment, when a power module is deallocated, it may be switchably disconnected from the power bus immediately. In another embodiment, when a power module is deallocated, it is not switchably disconnected from the power bus unless and until a determination has been made to allocate that power module to another dispenser.

At operation 425, the dispenser determines whether there is any power available for charging of the electric vehicle. If there is, then flow moves to operation 445 where the dispenser requests allocation of the remaining power modules, in a similar way as described with respect to operation 435. Flow then moves from operation 445 to operation 440. If there is not any power available, then flow moves to operation 450 where an alternative action is taken.

One alternative action is to wait until there is power available for charging the EV. The dispenser may periodically request the status of each power module of the power cabinet to determine when there is power available for charging the EV. Alternatively, the power cabinet and/or the other dispenser(s) that have been allocated power module(s) may periodically send status information of the power modules to the dispenser and/or to the network that can be accessed or transmitted to the dispenser.

Another alternative action is a dynamic allocation of the power modules where one or more power modules are deallocated from a different dispenser and allocated to the requesting dispenser. The dynamic allocation may be based on a set of one or more factors as previously described, and a set of predefined allocation rules. In an embodiment, the dynamic allocation of the power modules is performed by the group of dispensers connected to the power cabinet themselves. In another embodiment, the dynamic allocation of power modules is performed by the power cabinet connected to the group of dispensers. In another embodiment, the dynamic allocation of power modules is performed by a server that is connected with the power cabinet and/or group of dispensers. In another embodiment, the allocation of power modules is performed in cooperation with multiple entities (e.g., the dispensers and the network, the dispensers and the power cabinet).

Figure 5:
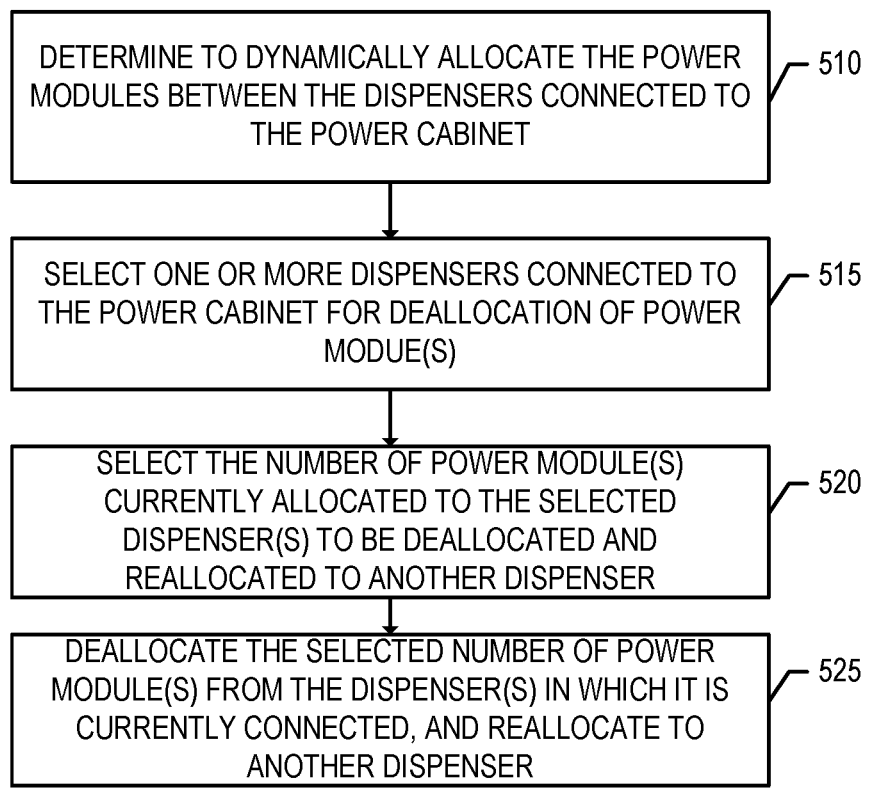
FIG. 5 is a flow diagram that illustrates exemplary operations for dynamic allocation of the power modules according to an embodiment.

FIG. 5 is a flow diagram that illustrates exemplary operations for dynamic allocation of the power modules according to an embodiment. The operations of FIG. 5 will be described with respect to the exemplary embodiments of the other figures. However, it should be understood that the operations of FIG. 5 can be performed by embodiments other than those discussed with reference to the other figures, and the embodiments discussed with reference to these other figures can perform operations different than those discussed with reference to FIG. 5.

At operation 510, a determination has been made to dynamically allocate the power modules between the dispensers connected to the power cabinet. The determination to dynamically allocate the power modules may be made as a result of the sum of the requested power draw of the connected dispensers exceeding the maximum amount supported by the power cabinet. In an embodiment, a dispenser that is allocated a power module is periodically checked whether it is utilizing its allocated power module(s), and if it is not utilizing its allocated power module(s), those power module(s) are deallocated and allocated to a different dispenser (if that dispenser has need for those power module(s)). For instance, an electric vehicle may ramp down its power usage as it is nearing charging completion, although it may still be connected to the dispenser. In such a situation, that EV may not need some or all of the power modules that are currently allocated to the dispenser for the EV. In an embodiment, the EV may indicate to the dispenser the rate of power that it currently desires (e.g., the EV may send a current command to the dispenser that can be used to determine how much power to supply to the EV). In another embodiment, the rate of power that is being dispensed through an EV is measured, and that measured amount is compared against the allocated power amount to determine whether the allocated power module(s) are being utilized. The metrology component may be included within each dispenser, coupled with each dispenser, and/or included in the power cabinet.

Next, at operation 515, one or more of the dispensers connected to the power cabinet that are currently allocated one or more power modules are selected to have one or more power modules be deallocated and reallocated to a different dispenser. Next, at operation 520, the number of power module(s) currently allocated to the selected dispenser(s) to be deallocated and reallocated to a different dispenser is determined. The decision to select a dispenser for power module deallocation, and/or the selection of the number of power module(s) to be deallocated, may take into consideration one or more factors, such as the duration that each electric vehicle connected to the dispensers has been charging; the duration that each electric vehicle connected to the dispensers has been parked in proximity to the dispensers; the time remaining on each charging session; the type of account associated with each charging session; the amount of current drawn by each electric vehicle connected to the dispensers; the percentage of charge complete of each electric vehicle connected to the dispensers; the percentage of charge remaining of each electric vehicle connected to the dispensers; the battery temperature of each electric vehicle connected to the dispensers; the type of each electric vehicle connected to the dispensers; a reservation status of each electric vehicle connected to the dispensers; the amount of power presently allocated to each dispenser (or the number of power modules presently allocated to each dispenser); the rate of power being dispensed by each dispenser; the number of electric vehicle(s) expected to arrive at the dispenser(s); and/or load condition information. Flow moves from operation 520 to operation 525.

At operation 525, the selected number of power module(s) for deallocation are deallocated from dispenser(s) in which it is currently connected, and reallocated to another dispenser. For example, with reference to FIG. 3, the power module 115H that was previously allocated to the dispenser 150A is deallocated (e.g., switchably disconnected from the power bus 140A) and allocated to the dispenser 150B (e.g., switchably connected to the power bus 140B). To deallocate a power module from a dispenser, a message may be sent from the dispenser to that power module directly (which may be relayed by the PCU of the power cabinet) that instructs the power module to switchably disconnect from the power bus. That dispenser may also instruct the power module to be allocated to a different dispenser. Alternatively, the dispenser that is deallocating the power module may send a message to the dispenser that will be allocated that power module that indicates that the power module has been instructed to be disconnected. The dispenser that will be allocated that power module may then send a message to the power module that causes the power module to be switchably connected to the power bus connecting the dispenser with the power cabinet.

In an embodiment, a dispenser sends a request for power to the power cabinet which in turn allocates the available power modules to the dispenser, regardless of whether the amount of allocated power exceeds the requested or supported amount of power. If the dispenser is allocated an excess amount of power, the dispenser releases the excess power module(s) so that they can be allocated to a different dispenser.

Figure 6:
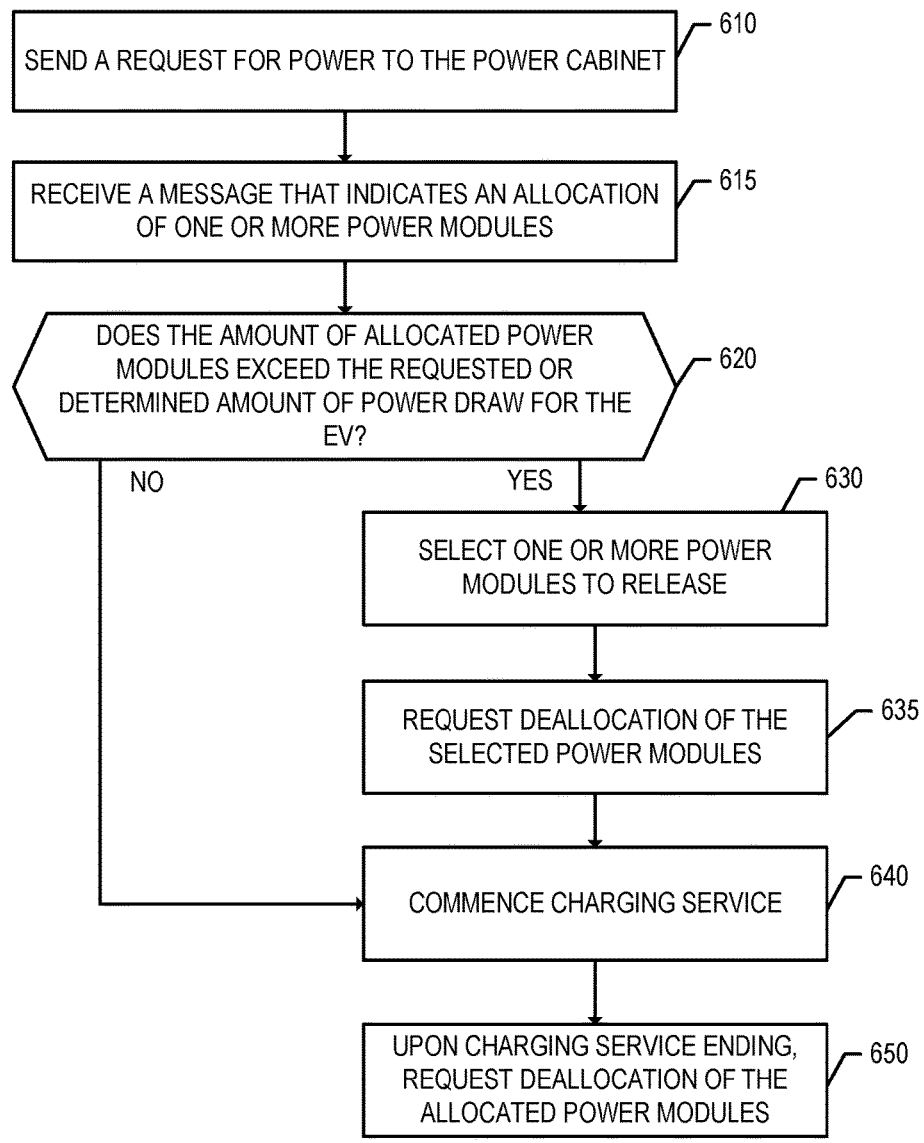
FIG. 6 is a flow diagram that illustrates exemplary operations for allocating power modules according to another embodiment.

FIG. 6 is a flow diagram that illustrates exemplary operations for allocating power modules according to an embodiment. The operations of FIG. 6 will be described with respect to the exemplary embodiments of the other figures. However, it should be understood that the operations of FIG. 6 can be performed by embodiments other than those discussed with reference to the other figures, and the embodiments discussed with reference to these other figures can perform operations different than those discussed with reference to FIG. 6.

At operation 610, a dispenser sends a request for power to the power cabinet. The request may be sent in reaction to an electric vehicle being connected to the dispenser. Alternatively, the request may be sent proactively such as based upon a reservation time of the dispenser nearing (within a predetermined time of the reservation time) or through determining a likelihood that an electric vehicle will be arriving at the dispenser (e.g., through history of use or through use of navigation and state of charge of the EV). The power cabinet receives the request and will allocate any available power modules to the requesting dispenser.

Next, at operation 615, the dispenser receives a message from the power cabinet that indicates an allocation of one or more power modules from the power cabinet. The message may include information about the allocated power modules (e.g., an identifier of each power module that has been allocated to the dispenser, an amount of time each allocated power module has been operating, and/or the amount of power that can be dispensed by each allocated power module).

The number of power modules and corresponding power may exceed the requested/determined or supported amount of power draw from the electric vehicle connected to the dispenser or expected to be connected to the dispenser. At operation 620, the dispenser determines whether the number of allocated power modules exceed the requested or determined amount of power draw for the electric vehicle. For instance, the dispenser compares the amount of allocated power with the requested or determined amount of power draw for the electric vehicle. For instance, with respect to FIG. 2, if the dispenser 150A is initially allocated all of the power modules 115A-L and each is capable of supplying 31.25 kW (a total of 375 kW), the total amount of power (375 kW) exceeds the amount of power that is capable of being drawn by the EV 170A (250 kW). If the amount of allocated power modules exceed the requested or determined amount of power draw for the EV, then flow moves to operation 630. If the amount of allocated power modules does not exceed the requested or determined amount of power draw for the EV, then flow moves to operation 640.

At operation 630, the dispenser selects one or more power modules to release such that the total amount of power does not exceed the requested or determined amount of power draw for the EV. For instance, with respect to FIG. 2, if the power modules 115A-L are all allocated to the dispenser 150A, the dispenser 150A may select four of those modules (a total of 125 kW) to release so that they can be allocated to the dispenser 150B. In an embodiment, the dispenser selects the power modules to release that have the most amount of operating hours. Flow then moves to operation 635 where the dispenser requests deallocation of the selected power modules. The requesting dispenser may send a command to each one of the allocated power modules directly (which may be relayed by the PCU 120) that causes the allocated power module to switchably disconnect from the power bus that is connected to the dispenser. As another example, the requesting dispenser may send a message to the power cabinet that indicates that it has released the selected power modules (the message may indicate an identifier of each of the selected power modules). In an embodiment, when a power module is deallocated, it may be switchably disconnected from the power bus immediately. In another embodiment, when a power module is deallocated, it is not switchably disconnected from the power bus unless and until a determination has been made to allocate that power module to another dispenser. Flow then moves to operation 640, where charging service commences. In an embodiment, commencing of the charging service of operation 640 may be prior to the operation 630. Flow moves from operation 640 to operation 650.

At operation 650, upon charging service ending, the dispenser requests deallocation of the allocated power modules. The charging service may end as a result of the charging session ending (e.g., the electric vehicle being disconnected from the dispenser). The requesting dispenser may send a command to each one of the allocated power modules directly (which may be relayed by the PCU 120) that causes the allocated power module to switchably disconnect from the power bus that is connected to the dispenser. For instance, with respect to FIG. 1, the dispenser 150A may transmit a command to the allocated ones of the power modules 115A-L (over the communication link 162) that causes those power modules to switchably disconnect from the power bus 140A. As another example, the requesting dispenser may send a command to the power cabinet that indicates that the dispenser has finished charging service and any allocated power module(s) may be deallocated from the dispenser. In an embodiment, when a power module is deallocated, it may be switchably disconnected from the power bus immediately. In another embodiment, when a power module is deallocated, it is not switchably disconnected from the power bus unless and until a determination has been made to allocate that power module to another dispenser.

At any time after the charging service has commenced or after the power modules have been allocated, a dynamic reallocation of power modules may be performed, such as described with respect to FIG. 5.

Selecting Power Module(s) for Allocation

As previously described herein, the number of power module(s) that are allocated to dispenser(s) may be determined dynamically. In an embodiment, the particular power module(s) that will be selected for allocation is dynamically determined. For instance, the selection of power module(s) for allocation may be performed according to a load balancing algorithm such that the usage amongst the power modules is roughly equal. This helps preventing a power module from wearing out faster than others due to overuse. In an embodiment, upon determining that a power module is to be allocated to a dispenser, the operating hours of the available power modules is determined and the power module with the lowest amount of operating hours is selected for allocation.

Deallocating a Power Module

Reference has been made herein to deallocating a power module. In an embodiment, deallocating a power module includes disconnecting the power module from the power bus in which it is currently connected. For instance, the PCU 120 may cause the power module to be switchably disconnected from the power bus in which it is currently disconnected. A deallocated power module is then available to be allocated. In another embodiment, deallocating a power module does not include disconnecting the power module from the power bus in which it is currently connected unless and until a determination has been made to allocate that power module to another dispenser.

Split Panel

Figure 7:
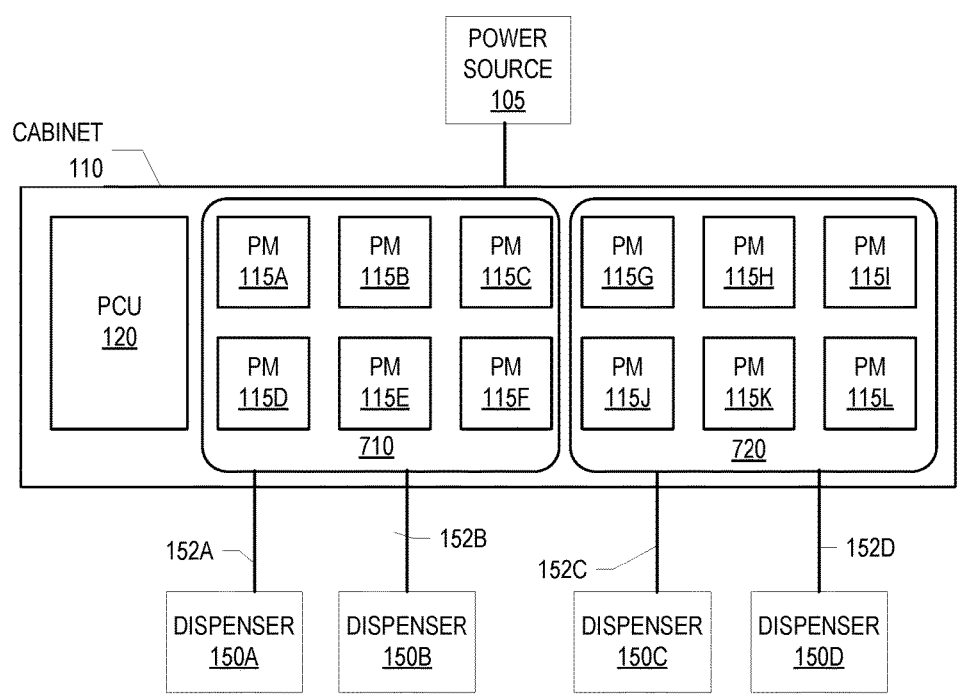
FIG. 7 illustrates an embodiment where the power cabinet is split into multiple power module groups.

Although FIGS. 1-3 illustrate the power modules of the power cabinet being able to be allocated to a single set of dispensers; in other embodiments a first group of the power modules of the power cabinet may be able to be allocated to a first set of dispensers and a second group of the power modules of the power cabinet may be able to be allocated to a second set of dispensers. For instance, FIG. 7 illustrates an embodiment where the power cabinet 110 is split into multiple power module groups 710 and 720 where the members of the power module group 710 (the power modules 115A-F) can be dynamically allocated to a first set of dispensers 150A-B via the output 152A-B and the members of the group 720 (the power modules 115G-L) can be dynamically allocated to a second set of dispensers 150C-D via the output 152C-D.

Dispenser

Figure 8:
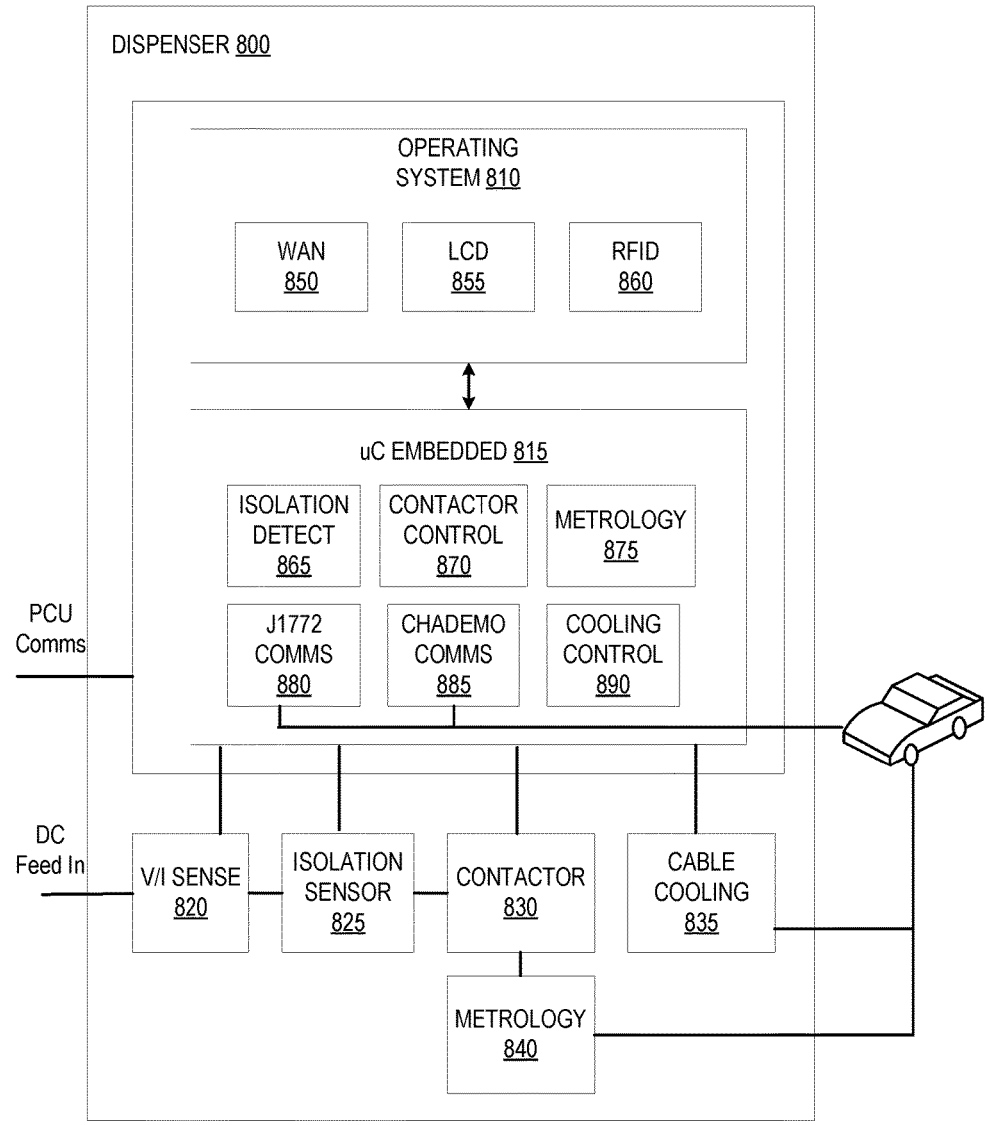
FIG. 8 illustrates an exemplary dispenser according to an embodiment.

FIG. 8 illustrates an exemplary dispenser according to an embodiment. The dispensers 150A-D may take the form of the dispenser 800. The dispenser 800 includes the operating system 810 that is coupled with the embedded microcontroller 815. The operating system 810 manages certain hardware and software for the dispenser 800 such as the WAN module 850 to manage a wide area network (WAN) connection for the dispenser 800, the LCD module 855 to manage a display of the dispenser 800, and the RFID module 860 that manages an RFID transceiver of the dispenser 800. The embedded microcontroller 815 executes the isolation detect module 865, the contactor control module 870, the metrology module 875, the J1772 communications module 880, the CHAdeMO communications module 885, and the cooling control module 890. Of course, it should be understood that the dispenser may include more, less, or different communication modules for communicating with different vehicle types.

The isolation detect module 865 manages the isolation sensor 825 to detect whether the circuits are isolated. For instance, with respect to a DC output, rail isolation is the resistance between each DC rail and ground including any measuring device, and total isolation is the parallel combination of both rail isolation values. The dispenser 800 will terminate a charge when the isolation of either rail to ground is under a certain amount. The contactor control module 870 manages the contactor 830 including causing the contactor 830 to open and close as appropriate. The V/I sense component 820 senses the current and voltage and provides the sensed data to the embedded microcontroller 815.

The metrology module 875 manages the metrology component 840 that meters electrical usage (e.g., drawn by the electric vehicle). The J1772 communications module 880 handles communications between the dispenser 800 and an electric car according to the J1772 standard. The CHAdeMO communications module 885 handles communications between the dispenser 800 and an electric car according to the CHAdeMO standard.

The cooling control module 890 manages the cooling of the dispenser 800 including managing the cable cooling component 835. The cable cooling component 835 may control a liquid cable cooling system, and may monitor and control the flow rate, pressure, inlet, outlet temperature, cable temperature, and/or connector temperature of the charging cable.

The techniques shown in the figures can be implemented using code and data stored and executed on one or more electronic devices (e.g., a dispenser, a power cabinet, a server). Such electronic devices store and communicate (internally and/or with other electronic devices over a network) code and data using machine-readable media, such as non-transitory machine-readable storage media (e.g., magnetic disks; optical disks; random access memory; read only memory; flash memory devices; phase-change memory) and transitory machine-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

The term "coupled," along with its derivatives, may be used in this description. "Coupled" is used to indicate that two or more elements, which may or may not be in direct physical or electrical contact with each other, co-operate or interact with each other.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A dispenser to charge electric vehicles, comprising:
a processor;
a non-transitory machine-readable storage medium that stores instructions that, when executed by the processor, cause the processor to perform the following:
request power from a power cabinet that includes a plurality of power modules for charging an electric vehicle, wherein the dispenser is one of a plurality of dispensers that are supplied power by the power cabinet, wherein each power module can be allocated to a single one of the dispensers at a time and supply an amount of power to that single one of the dispensers at that time, and wherein the plurality of power modules together cannot handle a maximum rating of the plurality of dispensers,
prior to charging service being provided to the electric vehicle through the dispenser, receive a message that indicates an allocation of a plurality of the power modules regardless of whether an amount of allocated power modules and corresponding amount of power exceeds an amount of power determined for charging the electric vehicle,
determine an amount of power for charging the electric vehicle,
in response to a determination that the amount of allocated power modules and corresponding amount of power exceeds the determined amount of power for charging the electric vehicle, send a message to the power cabinet to release one or more of the allocated power modules such that a total amount of allocated power modules and corresponding amount of power does not exceed the determined amount of power for charging the electric vehicle, and wherein the one or more of the allocated power modules are available to be allocated to another one of the plurality of dispensers after being released, and
in response to a determination to dynamically allocate the plurality of power modules between the plurality of dispensers, participate in a dynamic allocation of the plurality of power modules to the plurality of dispensers wherein at least one of the plurality of power modules that is presently allocated to the dispenser is deallocated and reallocated to another one of the plurality of dispensers, wherein the dynamic allocation of the plurality of power modules is based on a set of one or more factors including a maximum rate of power that can be dispensed by each of the plurality of dispensers.

2. The dispenser of claim 1, wherein the set of one or more factors further include one or more properties of active charging sessions on the plurality of dispensers.

3. The dispenser of claim 2, wherein the one or more properties of the active charging sessions include for each charging session, one or more of: a duration that each electric vehicle connected to the plurality of dispensers has been charging, a duration that each electric vehicle connected to the plurality of dispensers has been parked in proximity to the plurality of dispensers, a time remaining on each charging session, a type of account associated with each charging session, an amount of current drawn by each electric vehicle connected to the plurality of dispensers, a percentage of charge complete of each electric vehicle connected to the plurality of dispensers, a percentage of charge remaining of each electric vehicle connected to the plurality of dispensers, a battery temperature of each electric vehicle connected to the plurality of dispensers, a type of each electric vehicle connected to the plurality of dispensers, and a reservation status of each electric vehicle connected to the plurality of dispensers.

4. The dispenser of claim 2, wherein the set of one or more factors further includes load supply condition.

5. The dispenser of claim 1, wherein the dispenser is to select the amount of allocated power modules to release based on operating time of each of the plurality of power modules.

6. A method, comprising:
  requesting power from a power cabinet that includes a plurality of power modules for charging an electric vehicle, wherein the dispenser is one of a plurality of dispensers that are supplied power by the power cabinet, wherein each power module can be allocated to a single one of the dispensers at a time and supply an amount of power to that single one of the dispensers at that time, and wherein the plurality of power modules together cannot handle a maximum rating of the plurality of dispensers;
  prior to charging service being provided to the electric vehicle through the dispenser, receiving a message that indicates an allocation of a plurality of the power modules regardless of whether an amount of allocated power modules and corresponding amount of power exceeds an amount of power determined for charging the electric vehicle;
  determining an amount of power for charging the electric vehicle;
  responsive to determining that the amount of allocated power modules and corresponding amount of power exceeds the determined amount of power for charging the electric vehicle, sending a message to the power cabinet to release one or more of the allocated power modules such that a total amount of allocated power modules and corresponding amount of power does not exceed the determined amount of power for charging the electric vehicle, and wherein the one or more of the allocated power modules are available to be allocated to another one of the plurality of dispensers after being released; and
  responsive to determining to dynamically allocate the plurality of power modules between the plurality of dispensers, participating in a dynamic allocation of the plurality of power modules to the plurality of dispensers wherein at least one of the plurality of power modules that is presently allocated to the dispenser is deallocated and reallocated to another one of the plurality of dispensers, wherein the dynamic allocation of the plurality of power modules is based on a set of one or more factors including a maximum rate of power that can be dispensed by each of the plurality of dispensers.

7. The method of claim 6, wherein the set of one or more factors further include one or more properties of active charging sessions on the plurality of dispensers.

8. The method of claim 7, wherein the one or more properties of the active charging sessions include for each charging session, one or more of: a duration that each electric vehicle connected to the plurality of dispensers has been charging, a duration that each electric vehicle connected to the plurality of dispensers has been parked in proximity to the plurality of dispensers, a time remaining on each charging session, a type of account associated with each charging session, an amount of current drawn by each electric vehicle connected to the plurality of dispensers, a percentage of charge complete of each electric vehicle connected to the plurality of dispensers, a percentage of charge remaining of each electric vehicle connected to the plurality of dispensers, a battery temperature of each electric vehicle connected to the plurality of dispensers, a type of each electric vehicle connected to the plurality of dispensers, and a reservation status of each electric vehicle connected to the plurality of dispensers.

9. The method of claim 7, wherein the set of one or more factors further includes load supply condition.

10. The method of claim 6, further comprising:
  selecting the amount of allocated power modules to release based on operating time of each of the plurality of power modules.

* * * * *